Dec. 5, 1944.    H. P. HENRY    2,364,441
CONTROL FOR AIRCRAFT
Filed March 14, 1944
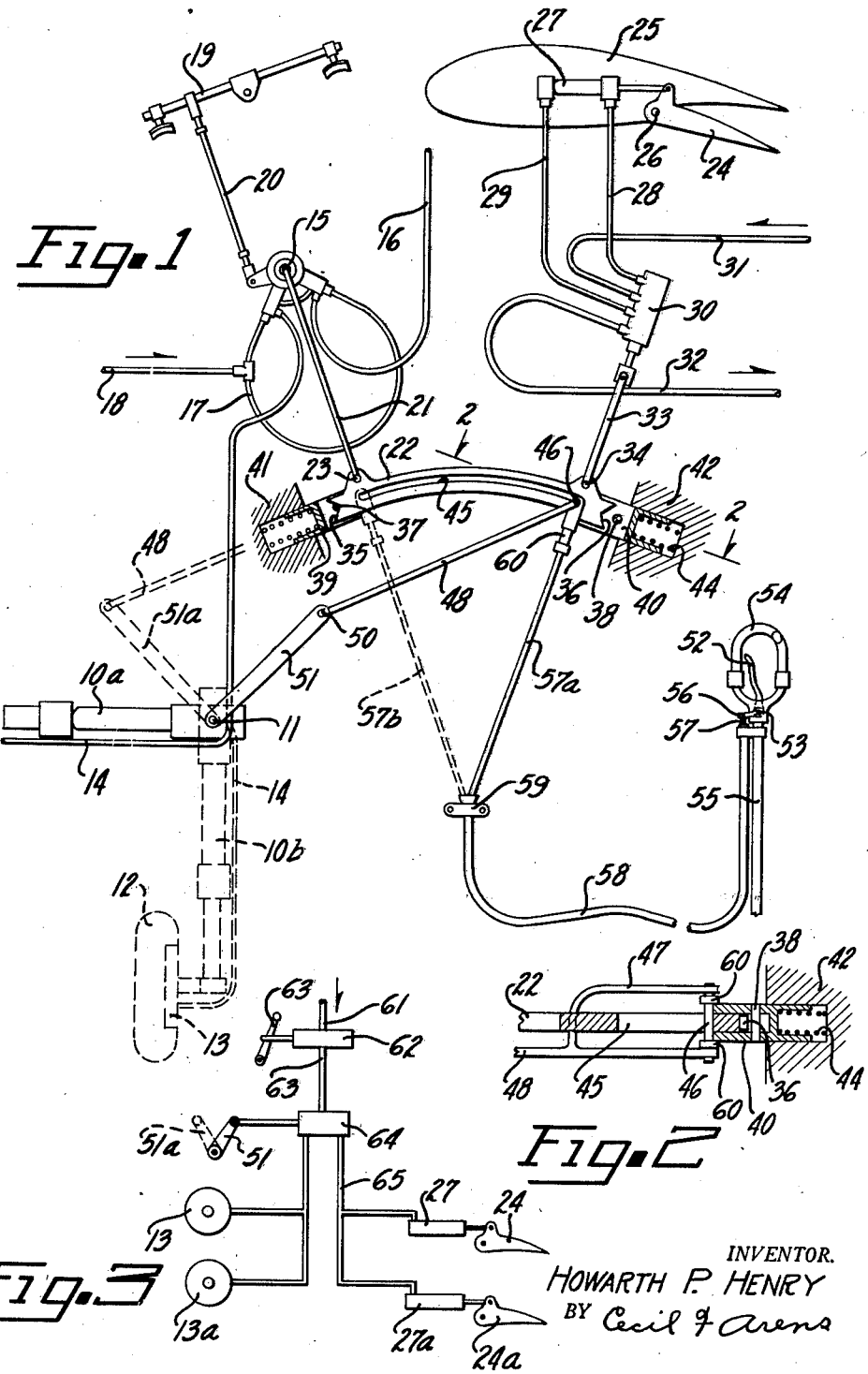
INVENTOR.
HOWARTH P. HENRY
BY Cecil F Arens
ATTORNEY Patented Dec. 5, 1944

2,364,441

UNITED STATES PATENT OFFICE 2,364,441

CONTROL FOR AIRCRAFT

Howarth Padgett Henry, Leamington Spa, England, assignor to Automotive Products Company Limited, Leamington Spa, England Application March 14, 1944, Serial No. 526,358
In Great Britain October 1, 1942

12 Claims. (Cl. 244—111)

This invention relates to controls for aircraft, and more especially to controls for devices which reduce or limit the speed during flight, such devices being in the form of movable surfaces which can be brought at will to a position in which they present a substantial surface to the relative wind, but are normally folded or retracted to an inoperative position. Such devices are commonly referred to as "dive brakes" and will be so referred to herein.

The modern aircraft, and more especially the modern military aircraft, upon which dive brakes are most likely to be used, is necessarily fitted with a very large number of controls, and any device which enables a single control to be used for two purposes without any risk of the pilot using it for the wrong purpose at any given time, provides an important simplification of the pilot's work, whilst at the same time saving weight, and space, and reducing design complications.

The object of the present invention is to provide operating means for dive brakes on an aircraft which are actuated by the pilot through the same control as is used for the landing wheel brakes of the aircraft.

According to the invention there is provided for an aircraft having a retractable undercarriage, a system for operating wheel brakes and also dive brakes, wherein a selector device actuated by movement of the undercarriage or the operating means thereof, places a common control member into operative connection with the wheel brakes on the undercarriage when the latter is lowered, and into operative connection with the dive brakes when the undercarriage is raised.

As a further aspect of the invention there is provided for an aircraft having dive brakes and a retractable undercarriage with wheel brakes, a common control system comprising a common mechanical actuating device, a system for applying the wheel brakes of the undercarriage, a system for operating the dive brakes, and a selector device actuated by movement of the undercarriage (or by control means bringing about undercarriage movement) so as to connect the mechanical actuating device operatively with the wheel brake system when the undercarriage is lowered and with the dive brake system when the undercarriage is raised.

Preferably the selector device comprises in combination with a lever which is connected at spaced positions with the wheel brakes and the dive brakes, and is arranged to be moved angularly by the common control member, means for shifting the fulcrum of the lever in accordance with the undercarriage position, whereby angular movement of the lever about its fulcrum leaves one brake system substantially unaffected, while operating the other. The means for shifting the fulcrum of the lever conveniently changes also the position of connection of the common control member to the lever. In a modified arrangement, where the wheel brakes and the dive brakes are both operated by pressure fluid, movement of the undercarriage is arranged to change the setting of a selector valve for diverting the supply of pressure fluid to the wheel brakes when the undercarriage is lowered, and to the dive brakes when the undercarriage is raised.

The invention is illustrated by way of example in the accompanying diagrammatic drawing, in which:

Figure 1 is a schematic view of a combined control system for the pneumatically operated wheel brakes and the hydraulically operated dive brakes of an aircraft;

Figure 2 is a sectional plan taken on the line 2—2 of Figure 1; and

Figure 3 shows a modified form of system in which both sets of brakes are operated by a common source of pressure fluid.

In the combined system shown in Figures 1 and 2 one leg of the retractable undercarriage of the aircraft is indicated in its raised position at 10a and in its lowered position by broken lines at 10b, the leg being arranged to pivot at 11 and being provided with a landing wheel 12 having a pneumatic brake indicated at 13. This is applied by compressed air fed thereto from a relay valve unit 15 of the usual form having two valve elements operable together or separately for straight or differential braking, through a pipe 14 leading from one valve element of the relay valve unit. A similar pipe 16 leads from the other valve unit of the relay valve 15 to the wheel upon the other leg (not shown) of the undercarriage. The two valve elements of the relay valve 15 receive compressed air from a reservoir through a supply pipe 18 and a connecting pipe 17, said valve being adjustable by the rudder bar 19 of the aircraft through a link 20 so as to produce differential braking of the two undercarriage wheels for permitting a steering action to be obtained. The relay valve 15 is actuated by a link 21 projecting radially from an arcuate lever 22, to which latter the link 21 is pivoted at 23.

One of the dive brakes of the aircraft is shown in Figure 1 and comprises a flap 24 pivoted to the aircraft wing 25 at 26 and arranged to be raised and lowered in the usual manner by a double-acting hydraulic motor unit 27. Pipes 28 and 29 connect the motor unit 27 with a selector valve 30 of the usual form, which selector valve is fed with pressure liquid through a pipe 31 from a pump or hydraulic accumulator (not shown) and is provided with a return pipe 32. The selector valve 30 is operated by a link 33 pivotally connected at 34 to the adjacent end part of the arcuate lever 22. Resilient means (not shown) are provided in connection with the relay valve 15 and the selector valve 30 to urge them to their "off" positions, in which the wheel brakes are released and the hydraulic pressure fed through the pipe 31 is diverted to the pipe 28 so as to hold the dive brake 24 in its raised inoperative position.

The arcuate lever 22 is formed at its ends with notches 35 and 36 adapted to be engaged by fulcrum pins 37 and 38 respectively extending between limbs of bifurcated plunger members 39 and 40. These plunger members are conveniently cup-shaped and are slidable within bores formed in fixed housings 41 and 42 respectively, springs 43 and 44 acting to urge the plungers 39 and 40 outwards towards the ends of the lever 22. The lever 22 is at all times guided at its ends between the limbs of the plungers 39 and 40. It is formed with an arcuate slot 45 extending for substantially its whole length for the accommodation of a sliding pin 46 (see Figure 2). The end parts of the pin 46 are engaged by the bifurcated end 47 of a link 48, which latter is pivoted at 50 to an arm 51 extending from the undercarriage leg 10a so as to move angularly about the pivot 11 as the undercarriage is retracted and lowered. Thus when the undercarriage is raised, as shown in full lines in Figure 1, the pin 46 is disposed at the extreme right-hand end of the slot 45, whereas lowering of the leg to the position 10b causes the arm 51 to assume the position shown in broken lines at 51a, in which case the sliding pin 46 is disposed at the extreme left-hand end of the slot 45. Normally the springs 43 and 44 press the plungers 39 and 40 towards the lever 22, so that when the sliding pin 46 is intermediate the ends of the slot 45 both fulcrum pins 37 and 38 engage the notches 35 and 36, thus locating the lever 22; when, however, the pin 46 is moved to either extreme position, it presses back the corresponding plunger 39 or 40 and disengages the adjacent fulcrum pin 37 or 38 from the notch in the end of the lever. The lever is thus free to move angularly about the other fulcrum pin.

The means for bringing about this angular movement takes the form of a Bowden wire mechanism operated by a hand lever 52 pivotally mounted at 53 within the handle 54 of the joystick 55 of the aircraft. The lever 52 has a lateral arm 56 to which a tension wire 57 is attached, said wire extending through a flexible compression resisting tubular sheath 58, which latter is anchored to a suitable fixture at 59. The projecting end 57a of the wire 57 is connected to a bifurcated fitting 60 having the upper ends of its limbs attached to the sliding pin 46, as will be seen in Figure 2. Thus when the hand lever 52 is moved to the right a pull is exerted upon the wire 57 and consequently the end of the lever 22 at which the pin 46 is positioned is pulled downwards. For instance, as shown in Figure 1, the pin 46 is disposed immediately adjacent the link 33 at the right-hand end of the lever 22 so that downward movement of the wire 57a causes the lever 22 to move angularly about the fulcrum pin 37, consequently actuating the selector valve 30 to apply the dive brake 24 and at the same time leaving the relay valve 15 quite unaffected. Movement of the undercarriage leg to the lowered position 10b automatically causes the pull of the wire 57a to take place along the line 57b and to be transferred to the link 21 and relay valve 15 of the wheel braking system without affecting the dive brake. Of course, as the pin 46 leaves the right-hand end of the slot 45 the spring 44 urges the fulcrum pin 38 into engagement with the notch 36, and as said pin 46 arrives at the left-hand end of the slot 45 it pushes back the plunger 39 so as to free the fulcrum pin 37 from the notch 35. The permissible movement of each of the plungers 39 and 40 under the action of the springs 43 and 44 is, of course, limited in each case by a suitable stop (not shown), to prevent, say, the spring 43 urging the lever 22 to the right when the common control means is operating the dive brakes as shown in Figure 1.

In the modified system shown diagrammatically in Figure 3 the dive brakes and the wheel brakes are both operated by liquid pressure fed through a common inlet 61. The actuation of the wheel brake system and the dive brake system is controlled by a common control valve 62 operated by a lever 63. The outlet pipe 66 from the control valve 62 leads to a selector valve 64 actuated by movements of the undercarriage conveniently through an arm indicated in its "undercarriage raised" position at 51. The supply of pressure liquid is then diverted through a pipe 65 to the motor units 27 and 27a of dive brakes 24 and 24a. When the undercarriage is lowered the arm 51 assumes the position 51a, as in the previous example, thus causing the selector valve 64 to divert the pressure liquid to wheel brakes 13 and 13a.

It will be understood that the arrangements which have been described are given merely by way of example and that various other modifications are possible. For instance, the selector device (i. e. the sliding pin 46 in Figure 1, or the valve 64 in Figure 3) may be operated directly from the manual or other control (not shown) for the undercarriage, any convenient form of mechanical connection being incorporated for this purpose. It may be found desirable in some cases to provide some form of servo-mechanism between the lever and the selector valve 30 for the dive brakes, in order to reduce the effort required to operate the valve. Such servo-mechanism may be of any convenient type. Further, the Bowden cable between the control lever and the floating lever could be replaced by a hydraulic transmission, and the brakes themselves might be operated hydraulically instead of pneumatically, a suitable hydraulic actuator being used in place of the pneumatic device described above. Moreover, the dive brakes might be operated pneumatically or electrically, the dive brake actuator, instead of being a liquid pressure selector valve, being a suitable pneumatic selector or an electric switching device for supplying current in the appropriate sense to electric motors coupled to the dive brakes.

What I claim is:

1. For an aircraft having a retractable undercarriage, a system for operating wheel brakes and also dive brakes, wherein a selector device actuated by movement of the undercarriage or the operating means thereof, places a common control member into operative connection with the wheel brakes on the undercarriage when the latter is lowered, and into operative connection with the dive brakes when the undercarriage is raised.

2. For an aircraft having dive brakes and a retractable undercarriage with wheel brakes, a common control system comprising a common mechanical actuating device, a system for applying the wheel brakes of the undercarriage, a system for operating the dive brakes, and a selector device actuated by movement of the undercarriage (or by control means bringing about undercarriage movement) so as to connect the mechanical actuating device operatively with the wheel brake system when the undercarriage is lowered and with the dive brake system when the undercarriage is raised.

3. A sytem as claimed in claim 1, wherein the selector device comprises in combination with a lever which is connected at spaced positions with the wheel brakes and the dive brakes, and is arranged to be moved angularly by the common control member, means for shifting the fulcrum of the lever in accordance with the undercarriage position, whereby angular movement of the lever about its fulcrum leaves one brake system substantially unaffected, while operating the other.

4. A system as claimed in claim 1, wherein the selector device comprises in combination with a lever which is connected at spaced positions with the wheel brakes and the dive brakes, and is arranged to be moved angularly by the common control member, means for shifting the fulcrum of the lever in accordance with the undercarriage position, whereby angular movement of the lever about its fulcrum leaves one brake system substantially unaffected, while operating the other, the said means for shifting the fulcrum of the lever changing also the position of connection of the common control member to the lever.

5. A system as claimed in claim 1, wherein the selector device comprises in combination with a lever which is connected at spaced positions with the wheel brakes and the dive brakes, and is arranged to be moved angularly by the common control member, means for shifting the fulcrum of the lever in accordance with the undercarriage position, whereby angular movement of the lever about its fulcrum leaves one brake system substantially unaffected, while operating the other, the said means for shifting the fulcrum of the lever changing also the position of connection of the common control member to the lever, and wherein the common control member is arranged to be connected with the lever at substantially the same position as that brake system which is in a condition to be operated by said common control member.

6. A system as claimed in claim 1, wherein the selector device comprises in combination with a lever which is connected at spaced positions with the wheel brakes and the dive brakes, and is arranged to be moved angularly by the common control member, means for shifting the fulcrum of the lever in accordance with the undercarriage position, whereby angular movement of the lever about its fulcrum leaves one brake system substantially unaffected, while operating the other, the common control member being movable by the undercarriage (or the undercarriage control means) along the lever so as to bring said member at either end of its movement along the lever into engagement with a corresponding fulcrum-carrying member, so that the fulcrum of that end of the lever is moved out of engagement with the lever.

7. A system as claimed in claim 1, wherein the selector device comprises in combination with a lever which is connected at spaced positions with the wheel brakes and the dive brakes, and is arranged to be moved angularly by the common control member, means for shifting the fulcrum of the lever in accordance with the undercarriage position, whereby angular movement of the lever about its fulcrum leaves one brake system substantially unaffected, while operating the other, both ends of the lever being notched, each for engagement with the corresponding fulcrum, which fulcra hold the lever against angular movement except when the common control member is in either one of its operative positions.

8. A system as claimed in claim 1, wherein the selector device comprises in combination with a lever which is connected at spaced positions with the wheel brakes and the dive brakes, and is arranged to be moved angularly by the common control member, means for shifting the fulcrum of the lever in accordance with the undercarriage position, whereby angular movement of the lever about its fulcrum leaves one brake system substantially unaffected, while operating the other, the lever being arcuately curved substantially about an anchorage point of means to operate the common control member.

9. A system as claimed in claim 1, wherein the common control member is actuated by a Bowden wire mechanism adapted to bend as the common control member is moved by the undercarriage.

10. A system as claimed in claim 1, wherein both brake systems are operated by fluid pressure.

11. A system as claimed in claim 1, wherein the wheel brake system is operated by air pressure and the dive braking system by liquid pressure.

12. A system as claimed in claim 1, wherein both brake systems are operated from the same source of pressure fluid, movement of the undercarriage being arranged to change the setting of a selector valve for diverting a supply of pressure fluid to the wheel brakes when the undercarriage is lowered, and to the dive brakes when the undercarriage is raised.

HOWARTH PADGETT HENRY.